United States Patent [19]
Yelvington

[11] Patent Number: 5,811,138
[45] Date of Patent: Sep. 22, 1998

[54] SYRINGE ENCAPSULATION DEVICE

[75] Inventor: Richard Yelvington, Jacksonville, Fla.

[73] Assignee: Imagination Medical, Inc., Jacksonville, Fla.

[21] Appl. No.: 804,634

[22] Filed: Feb. 25, 1997

[51] Int. Cl.$^6$ .................................................. B29C 43/36
[52] U.S. Cl. ..................... 425/384; 100/240; 100/317; 264/DIG. 69; 425/398; 425/401; 425/407; 425/420; 425/422; 425/444; 425/812; 425/DIG. 46
[58] Field of Search ....................... 425/384, 398, 425/401, 407, 420, 422, 451.4, 438, 444, 812, DIG. 46; 264/320, 325, 334, DIG. 69; 100/316, 317, 318, 240, 245

[56] References Cited

U.S. PATENT DOCUMENTS

| | | | |
|---|---|---|---|
| 1,597,898 | 8/1926 | Jegge | 425/407 |
| 2,613,397 | 10/1952 | Borkland | 425/398 |
| 3,672,807 | 6/1972 | Genz | 425/422 |
| 3,947,210 | 3/1976 | Levites | 425/556 |
| 5,263,841 | 11/1993 | De Soet | 425/407 |
| 5,489,200 | 2/1996 | MeGraw et al. | 425/407 |

FOREIGN PATENT DOCUMENTS

| | | | |
|---|---|---|---|
| 1601688 | 10/1970 | France | 425/451.4 |
| 58-160108 | 9/1983 | Japan | 425/442 |

*Primary Examiner*—Patrick Ryan
*Assistant Examiner*—Joseph Leyson
*Attorney, Agent, or Firm*—Thomas C. Saitta

[57] ABSTRACT

A device for the encapsulation of syringes and other hazardous plastic waste having needles or other sharp elements, the device having a melt chamber with a reciprocating compaction head, the weight of the compaction head providing the force to conform molten plastic into a puck covering the needle points. Flow release apertures allow for escape of gases and provide an overflow conduit for excess molten plastic. The puck adheres to the compaction head and is ejected back into the melt chamber for removal and disposal.

14 Claims, 9 Drawing Sheets

SYRINGE ENCAPSULATION DEVICE

BACKGROUND OF THE INVENTION

This invention relates generally to the field of devices for the destruction, encapsulation or disposal of potentially hazardous plastic waste, especially such waste comprising used medical syringes with attached needles or lancets. More particularly, the invention relates to such devices which melt and compact the plastic waste to completely encapsulate the needles into a sterile, disposable slug.

It is necessary to dispose of used medical syringes, lancets and blood test strips in a manner which minimizes the possibility of injury or infection to persons handling the syringes, at the initial point of use and disposal as well as all along the handling chain to final disposition in a land fill or the like. Numerous methods or devices have been developed to address this problem. Some such devices provide means to cap or enclose the needle, but enclosure of the needle by a physical housing requires the person to perform an additional physical act where inadvertent contact is possible and does not address the need to sterilize the syringes to kill infectious organisms. Devices are also known which provide protection from the syringe needles by melting the plastic portions of the syringes such that the needles are encased in the resulting plastic mass. This technique is an improvement over the capping method, since the used needle is simply deposited into the disposal device with minimal handling. The temperature achieved within the melt chambers of these devices is greater than that required to melt the plastic in order to also sterilize the waste material.

Examples of such combination disposal and sterilization devices are shown in U.S. Pat. No. 4,800,958 to Yerman and in U.S. Pat. No. 5,207,994 to Suziki. These devices provide a cylindrical melting chamber with a reciprocating piston. The waste syringes are placed into the chamber, heated and compressed to form a puck or slug to encapsulate the needles. The plastic slug is then removed by opening separate access plates or doorways and disposed of. Both of these devices, as well as all other similar known devices, involve multiple joints, doorways, hinges and other components which are susceptible to fouling from plastic flash. Plastic flash is molten plastic which escapes from the melting chamber due to the effects of gravity or pressure from the compacting piston. Syringe plastic contains paraffin, which becomes a highly viscous liquid at temperatures well below those required to sterilize the plastic waste. The sterilization step requires temperatures in excess of 350 degrees F to achieve sterilization in a relatively short time period. During the melting process, at about 275 degrees F, the paraffin becomes a highly viscous liquid which is forced past the seals and joints in the known devices. To counter this, highly efficient seals and joints must be constructed with very tight precision. These air and fluid tight seals prevent the escape of water vapor, steam and other outgas products produced during the melting process. Since they cannot escape and are non-compressible, they recondense on or within the waste slug and create gaps and voids within the slug through which the needle points may be exposed.

It is an object of this invention to provide a device for the destruction, sterilization and encapsulation of hazardous plastic waste products, and in particular waste such as used medical syringes with attached needles, lancets, blood test strips or the like, which provides a safe and efficient means to form the plastic waste into a disposable plastic slug with the needles securely encased therein by combination of pressure and temperature. It is a further object to provide such a device which allows gas and liquids to escape from the melting chamber such that they are not retained within the waste slug to create voids. It is a further object to provide such a device which eliminates the problems associated with plastic flash by providing a melting chamber machined from a single block or cast to have no joints or seams, and which reduces the number of joints, seals and moving components required to accomplish the task in order to simplify the device. It is a further object to provide such a device in which the compaction head compresses the molten material by its own weight only under gravity effects with no extraneous applied force. It is a further object to provide such a device in which a reciprocating compaction head for the plastic waste is constructed such that the waste slug becomes temporarily attached to the compaction head such that the plastic slug is lifted from the bottom of the melt chamber by retraction of the compaction head and is subsequently knocked loose from the compaction head for easy removal.

SUMMARY OF THE INVENTION

The invention is a device for the safe destruction, sterilization and encapsulation of hazardous plastic waste, such as in particular used medical syringes with attached needles, lancets or blood test strips, comprising in general an external housing having an opening for the insertion of the plastic waste and for the removal of a compacted, sterilized plastic plug after the material has been processed. The housing contains a seamless melt chamber, preferably generally elliptical or rectangular with rounded ends and generally relatively thin and elongated, which can be pivoted through the opening in the housing to receive the plastic waste. A reciprocating compaction head corresponding to the configuration of the side walls of the melt chamber is positioned to drop into the melt chamber during the melting operation, the weight of the compaction head supplying the pressure necessary to properly compact the molten plastic waste to encapsulate the needles and other sharp objects. Heating means are provided to elevate the temperature within the melt chamber to at least 350 degrees F in order to melt and sterilize the plastic waste. The compaction head is provided with pressure release apertures which allow gases and liquids to flow into the apertures and capture pins to retain the hardened plastic waste puck on the compaction head. The bottom of the compaction head is provided with a middle ridge to force the molten plastic toward the ends of the melt chamber and the ends of the compaction head are provided with depending bevelled portions to eliminate voids at the ends of the puck.

With the compaction head in the fully raised position, the melt block can be pivoted forward through an aperture in the main housing such that plastic waste may be placed into the melt chamber. The melt block is then pivoted back into the housing, which allows the device to be activated. The melt chamber is locked in position and the compaction head is released to rest on top of the waste in the melt chamber. The heating means then elevates the temperature within the melting chamber to approximately 350 degrees F to melt and sterilize the plastic waste. As the plastic melts, the molten waste is compacted by the weight of the compaction head and shrinks from the sides of the melt chamber. Gases and excess liquids flow into the release apertures in the compaction head to preclude void formation in the puck. Once the melt chamber has cooled, the lifting cam raises the compaction head from the melt chamber. The plastic waste now is in the form of a plastic slug which is attached to the capture pins, and possibly the release apertures of the compaction head, and it too is raised from the bottom of the melt chamber. As the compaction head is withdrawn to the fully retracted position, stationary ejection pins aligned with the release holes are encountered, which ejects the solid puck into the base of the melt chamber. The puck is removed by pivoting the melt block forward from the housing.

DETAILED DESCRIPTION OF THE INVENTION

With reference to the drawings, the invention will now be described in detail with regard to the best mode and preferred embodiment. The invention is in general a device for the safe encapsulation and sterilization of hazardous plastic waste, in particular plastic syringes with needles, lancets or other sharp objects which can cut or puncture individuals disposing of the waste.

Figure 1:
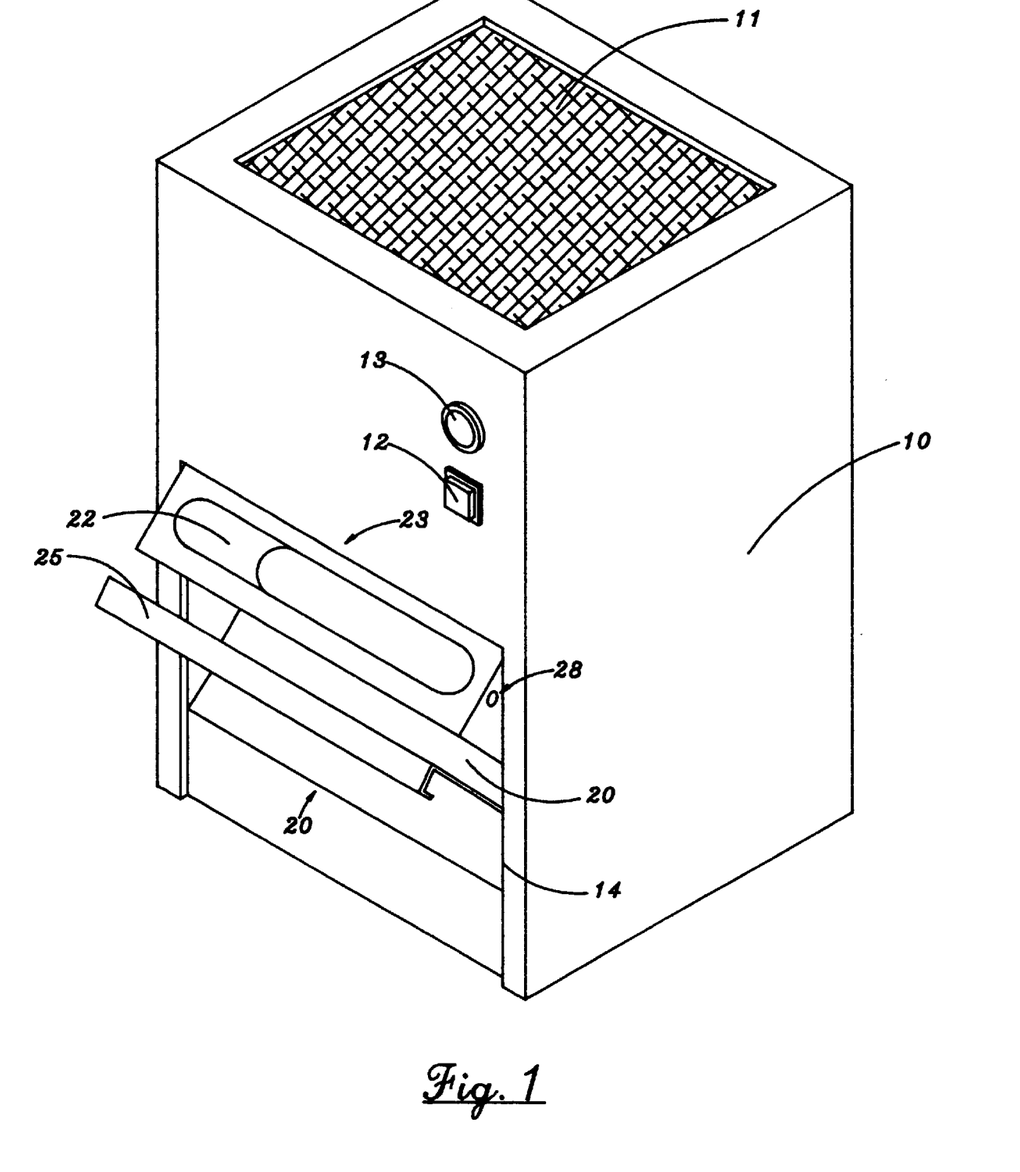
FIG. 1 is a perspective view of the housing with the melt block shown pivoted into the open position for insertion of plastic waste or removal of the processed puck.

Referring to FIG. 1, a depiction of the external configuration of the device is provided. The invention comprises in general a housing 10, shown here as generally rectangular, which can be made of hard plastic, metal or the like. An access aperture 14 is provided on the front of the housing 10, through which pivots the upper portion of the melt block housing 20. An actuation button or switch 12, an operations indicator light 13 and a filter 11 are mounted on the housing 10. The melt block housing 20 is pivoted forward through the access aperture 14 by pulling on handle 25, which acts a closure or door when the melt block housing 20 is pivoted back into the closed or processing position. The melt block housing 20 pivots at least far enough to allow the open top 23 of the melt chamber 22 to be fully exposed and unobstructed by the housing 10, so that plastic waste 98 can be easily deposited into the melt chamber 22, and preferably pivots completely through the horizontal position such that the open top 23 faces downward. This allows the hardened puck 99 of waste plastic to fall from the melt chamber 22 without the need for handling. A detent means 28, shown here as a raised member or depressible pin which abuts the side of access aperture 14, stops the pivoting of the melt block housing 20 at the loading position with the melt chamber 22 facing upward. The stopping force of the detent means 28 can be overcome by applying more force to the handle 25, allowing the melt block housing 20 to pivot through horizontal.

Figure 2:
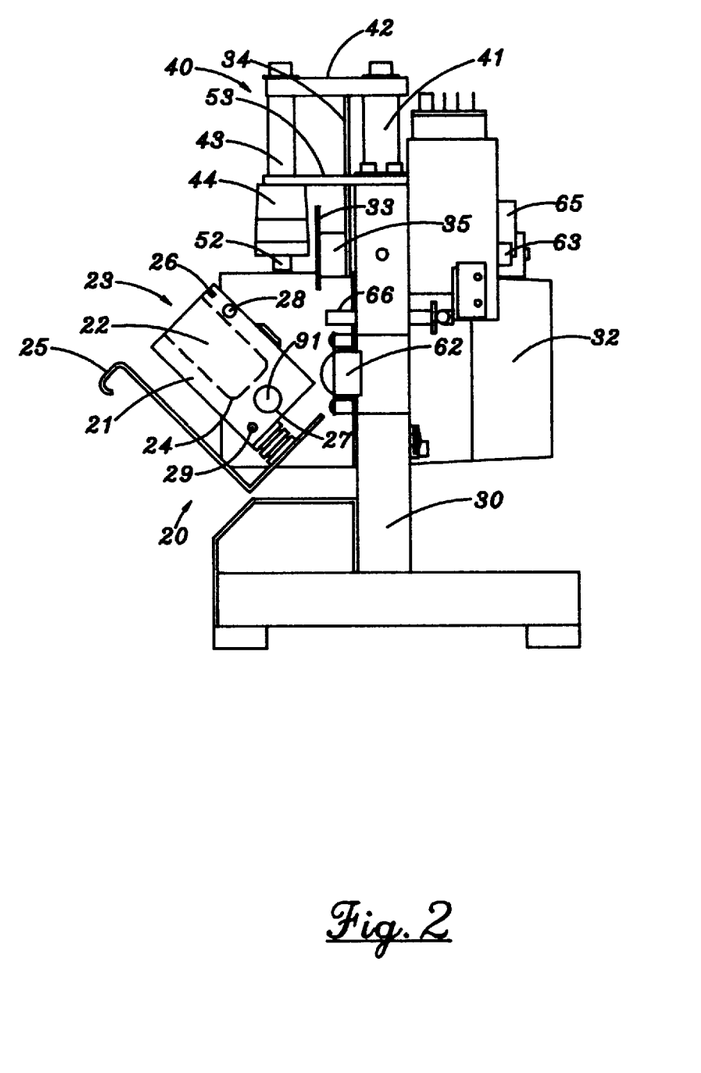
FIG. 2 is a side view of the device with the housing removed and the melt block shown exposed and pivoted into the open position for insertion of plastic waste or removal of the processed puck.
Figure 3:
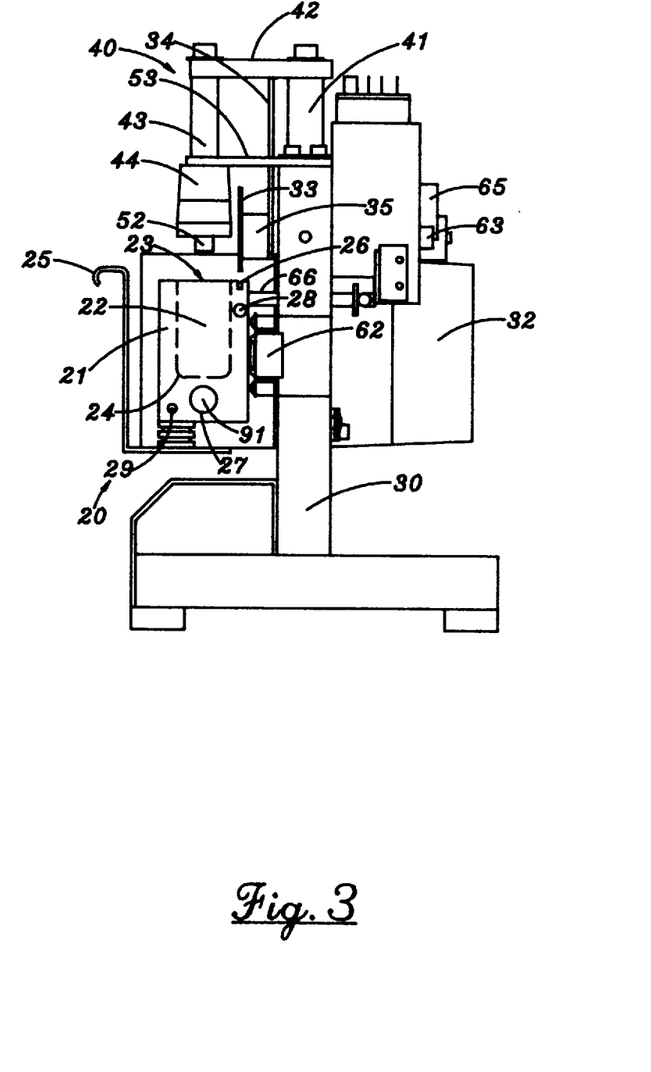
FIG. 3 is a side view of the device with the housing removed and the melt block shown exposed and in the closed position prior to activation.
Figure 4:
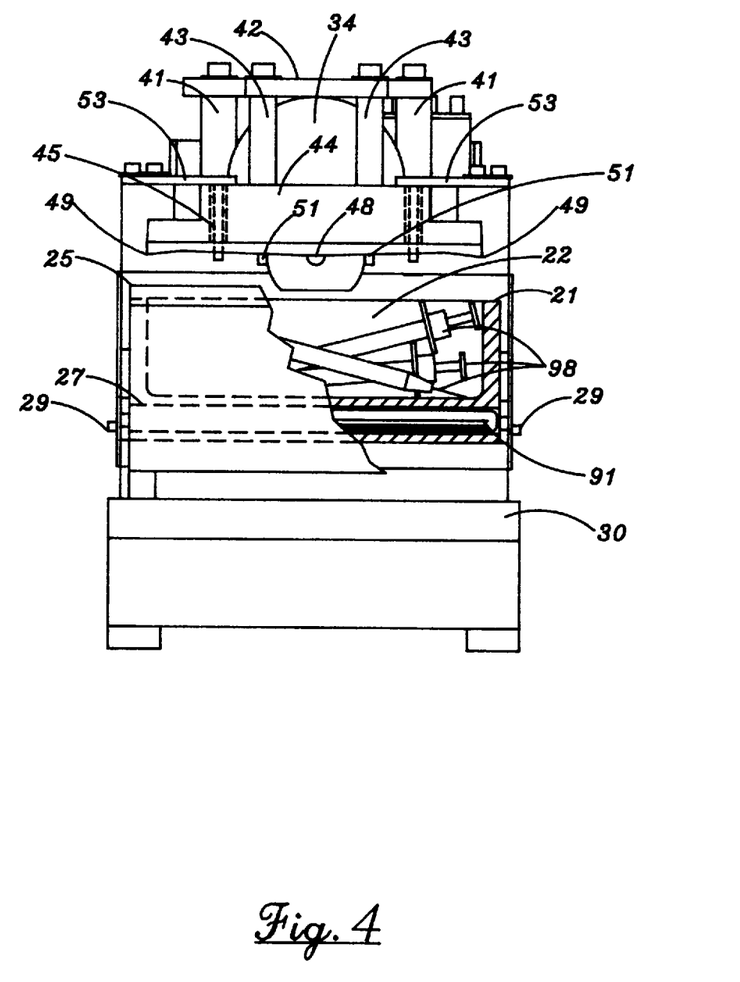
FIG. 4 is a front view showing the melt block, cams and the piston assembly with the piston assembly shown in the raised position prior to activation and the melt chamber partially exposed.

As shown in FIGS. 2 through 5, the melt block housing 20 mainly comprises a melt block 21, melt chamber 22 and handle 25. The melt block 21 is composed of a metal with good thermal transfer properties, such as aluminum, and is preferably constructed as a single piece with the melt chamber 22, heating element bore 27 and locking recess 26 machined from a solid block of metal. The melt chamber 22 has an open top 23 and preferably seamless interior walls 24. The melt chamber 22 is preferably generally elongated laterally, such that its lateral distance as taken from the front is much longer than the transverse distance, to best receive syringes or other plastic waste 98 in a horizontal manner. The open top 23 and melt chamber 22 may be configured cross-sectionally as a rectangle with rounded corners or ends, or as an elongated ellipsoid, and the melt chamber 22 should have a depth sufficient to receive a number of syringes, lancets or other plastic waste 98, as seen in FIG. 4. The interior wall 24 along any vertical line is parallel to the travel axis of the linearly reciprocating compaction head 44 of the piston assembly 40. In order to heat the melt chamber 22, a heating element bore 27 is provided through the melt block 21 adjacent the melt chamber 22. A rod-shaped heating element 91, of a type well known in the art, is positioned within the heating element bore 27 and connected electrically to the control elements of the device. Locking means, such as locking recess 26, shaped as a channel or a slot in the top side of the melt block 21 and positioned to receive the rotating locking cam 33, prevents the melt block housing 20 from pivoting during the processing steps. Pivoting means 29, such as a pin mounted on the sides of the melt block 21, extends outward into housing 10 to allow the device to be tilted forward through access aperture 14 for loading and puck removal, as seen in FIGS. 1 and 2, and back into the vertical position against backstop pin 54, which is preferably adjustable for precise alignment of the melt chamber 22 relative to the compaction head 44. The melt block 21 is connected to handle means 25 so that the positioning of the melt block 21 is controlled by the handle 25. The melt chamber 22 may be coated with release material such as TEFLON brand polytetrafluoroethylene.

Figure 10:
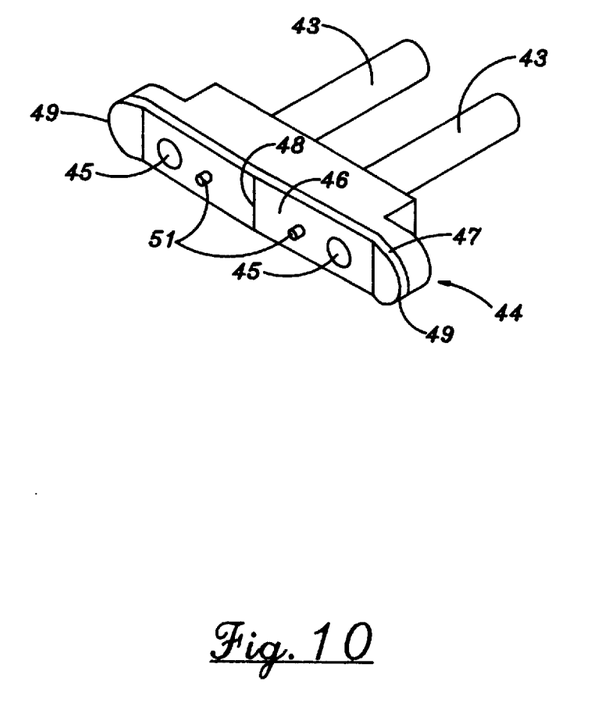
FIG. 10 is a perspective view of the compaction head contact face.

The piston assembly 40, shown in FIGS. 2 through 5, 9 and 10, comprises in general a compaction head 44 which is configured to correspond to the cross-sectional shape of the melt chamber 22 at very close tolerances, such that the compaction head 44 may be inserted into and withdrawn from the melt chamber 22. The side wall 47 of the compaction head 44 abuts the interior wall 24 of the melt chamber 22 so closely that no molten plastic will pass between during compaction. The compaction head 44 is mounted on a pair of connecting rods 43 which are joined to a connecting flange 42 extending from two guide rods 41. Guide rods 41 fit into guide sleeves 31 which are positioned in the fixed internal support framework 30, with the guide rods 41 free to move reciprocatingly within the guide sleeves 31. The connecting rods 43, guide rods 41 and guide sleeves 31 extend vertically in parallel alignment, such that the entire piston assembly 40 may move up and down relative to the melt chamber 22 in a linear manner. The compaction head 44 has at least one and preferably a pair of vertically oriented flow release apertures 45 extending completely through compaction head 44. The flow release apertures 45 provide a conduit for the release of gases from the melt chamber 22 during compaction and also provide space to receive excess molten plastic, which hardens inside the flow release apertures 45 to form short plugs which assist in attaching the puck 99 to the compaction head 44. The flow release apertures 45 also provide a conduit for ejection pins 52, which are connected to a mount 53 fixed to the support framework 30 and are of sufficient length to extend through the compaction head and slightly beyond the contact face 46 to knock off the hardened puck 99 when the piston assembly 40 is in the fully retracted position. The contact face 46 is the bottom side of the compaction head 44 and is the surface which contacts the molten plastic during compaction. The contact face 46 may be planar, curved or of various shapes, but preferably comprises a raised transverse middle ridge 48 which forms an apex in the center of the contact face 46, as shown in FIG. 10. Because the bulk of the plastic waste 98 typically occupies the middle of melt chamber 22, since the bulk of the material of a syringe is between the needle and the plunger head, as seen in FIG. 4, most of the molten plastic will be in the middle of the melt chamber 22. The middle ridge 48 pushes the molten plastic toward each end, better filling the melt chamber 22 so that the hardened puck 99 will have no voids and will fully encase the needles. Also preferably, each end of the contact face 46 is formed with a raised end bevel or shoulder 49. The end bevels 49 further insure that there will be no voids on the ends of the puck 99 where the needles will reside by directing gases or light liquids back toward the center of the melt chamber 22. It is also preferred that contact face 46 be provided with one or more capture pins 51 extending a short distance below the contact face 46. As the molten plastic cools it shrinks, such that the puck 99 will grip the capture pins 51 and be drawn upward when the piston assembly 40 is retracted. Likewise, the shrinkage of the puck 99 as it cools causes it to separate from the interior wall 24 of the melt chamber. The compaction head 44 is preferably composed of a metal with good thermal properties, such as aluminum, so that it will absorb heat from the melt block 21 and pass the heat onto the top of the plastic waste 98 during the melting and compaction process.

Figure 5:
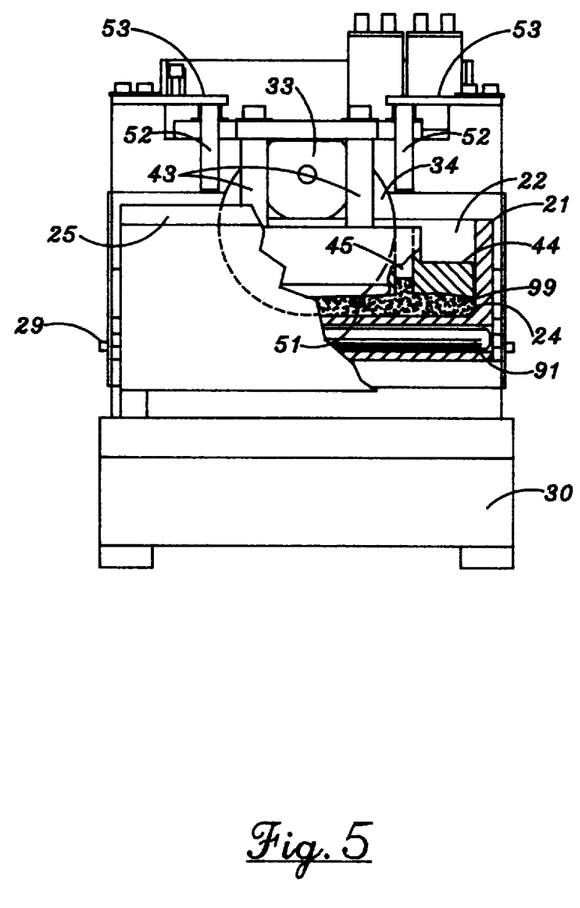
FIG. 5 is a front view similar to FIG. 4 with the piston assembly shown in the compaction position and the melt chamber partially exposed.
Figure 6:
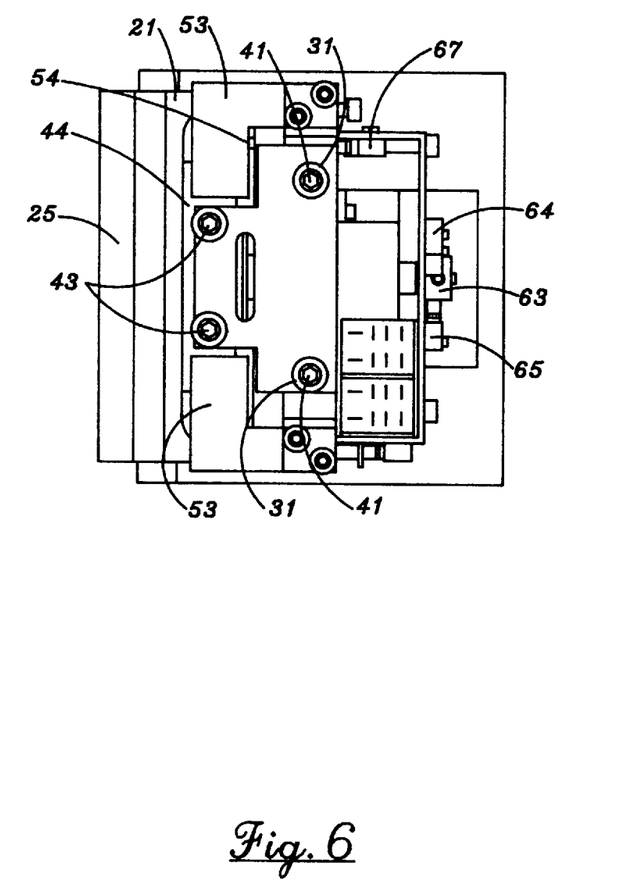
FIG. 6 is a top view of the device with the housing removed with the melt block in the closed position.
Figure 7:
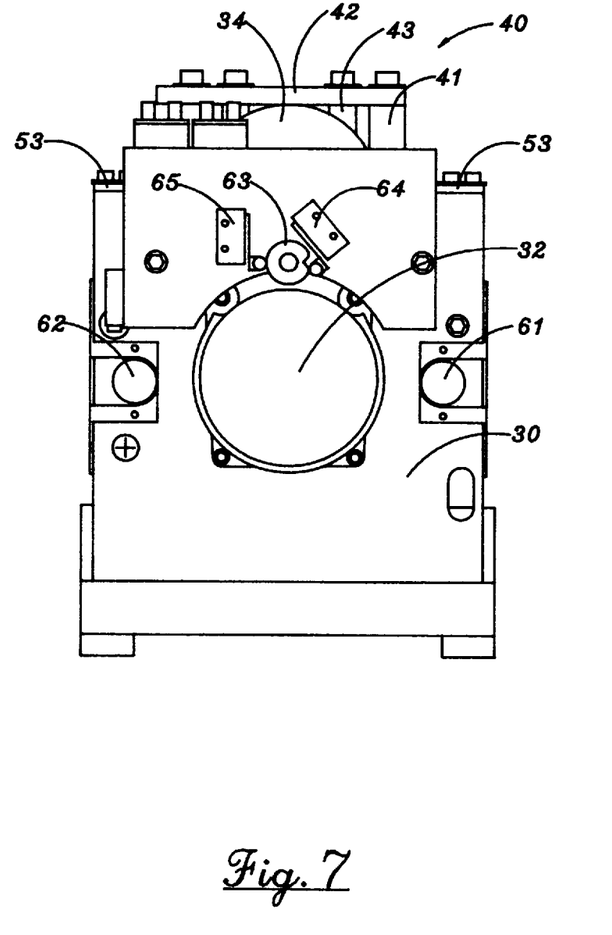
FIG. 7 is a rear view of the device with the housing removed.
Figure 8:
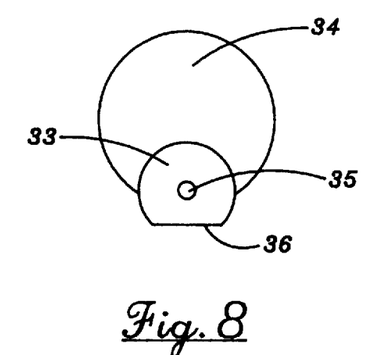
FIG. 8 is a front view of the lifting and locking cams.
Figure 9:
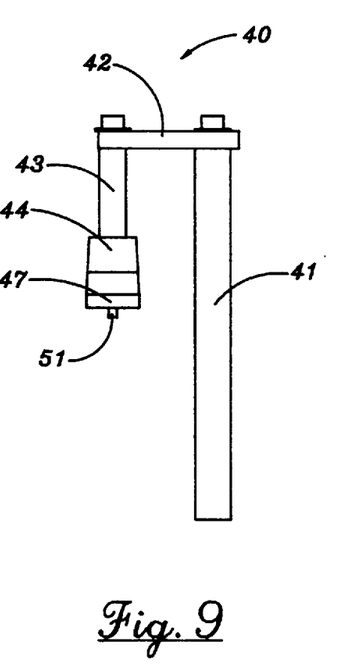
FIG. 9 is a end view of the piston assembly.

The securing of the melt block housing 20 in the fully closed vertical position in proper alignment with the compaction head 44 and the movement of the piston assembly 40 is controlled by a locking cam 33 and a lifting cam 34, as shown in FIGS. 2 through 5 and 8. The cams 33 and 34 are mounted on a rotating shaft 35 connected to a motor 32. The rotating shaft 35 is joined at the central axis of locking cam 33, which has a portion of its circumference removed to form a release key 36. The lifting cam 34 is larger and the rotating shaft 35 is mounted off center. The locking cam 33 is positioned in parallel alignment with the locking recess 26 of the melt block 21. In the off or melt chamber access condition, when the melt chamber 22 is being loaded with plastic waste 98 or when the hardened waste puck 99 is being removed from the melt chamber 22, the release key 36 of locking cam 33 faces the melt block 21 and does not interfere with the pivoting of the melt block housing 20. When the melt block housing 20 is closed and the device is activated, the motor rotates the rotating shaft 35 and the locking cam 33. As the release key 36 rotates the full perimeter of the locking cam 33 extends into the locking recess, as shown in FIGS. 4 and 5, which prevents the melt chamber housing 20 from being pulled forward until the locking cam 33 has completed a full rotation. After activation, the rotating shaft 35 also rotates lifting cam 34, which is positioned such that it is in the highest extended position when the release key 36 of locking cam 33 faces downward. Lifting cam 34 abuts the underside of the connecting flange 42 on the piston assembly 40 and supports it in place. As lifting cam 34 turns, because it is asymmetrically mounted, the distance from the rotating shaft 35 to the most vertical peripheral point on lifting cam 34 decreases. This allows the piston assembly 40 to move downward, with the guide rods 41 descending into the guide sleeves 31 and the compaction head 44 descending through the open top 23 and into melt chamber 22 until the contact face 46 rests on the plastic waste 98 loaded into the melt chamber 22 for processing. The lifting cam 34 continues to the one half rotation position and no longer contacts the piston assembly 40. The piston assembly 40 presses against the plastic waste under the force of its own weight. After the plastic waste 98 has been melted and compacted into a hardened puck 99, the motor is again activated and the cams 33 and 34 begin to rotate. As lifting cam 34 rotates asymmetrically, its perimeter lifts connecting flange 42 of piston assembly 40, thereby raising the compaction head 44 and puck 99. As the compaction head 44 rises, fixed ejection pins 52 enter the flow release apertures 45 and cause puck 99 to be ejected into the melt chamber 22. When the rotating shaft 35 has completed a full cycle, the compaction head 44 is fully removed from the melt chamber 22 and the release key 36 of the locking cam 33 is now aligned with the locking recess 26, which allows the melt block housing 20 to be pulled forward through the access aperture 14.

The processing is controlled by various thermostats and other electrical controls, all connected in circuit, and several safeguards are preferably built in to the system. To process plastic waste 98, the melt chamber is filled between a minimum height to insure that there is enough molten plastic to encase the needles and a maximum height to insure that there will be no overflow from the flow release apertures 45. The melt chamber housing 20 is pivoted to the closed position, which is sensed by a door switch 66. The actuation button 12 is pressed to start the motor 32, which preferably turns at a rate of approximately 1 rpm, rotating the locking cam 33 to prevent pivoting of the melt block housing 20 and rotating the lifting cam 33 to lower the piston assembly 40. At one half rotation, a notched motor control cam 63 activates a first microswitch 64, turning the motor 32 off and activating the heating element 91. At this point, a fill high-low switch 67 senses the position of the compaction head 44 to insure that the proper amount of plastic waste 98 is contained in the melt chamber 22. If the load is not correct, the heating element 91 is turned off, the motor is reactivated and the piston assembly 40 is lifted back to the start position. The heating element 91 is set to elevate the temperature within the melt chamber 22 to approximately at least 350 degrees F, which may take in the range of eight minutes. This temperature is sufficient to fully melt the plastic waste 98 as well as to sterilize any biological hazards. Because the compaction head 44 abuts the interior wall 24 of the melt chamber 22 and because the temperature elevation occurs over an extended number of minutes, the compaction head 44 also heats up and assists in melting the plastic waste 98. Because the weight of the piston assembly 40 continually presses against the melting plastic waste 98, the molten plastic is continuously properly distributed even though there may be differential melting rates for different components of a particular syringe, lancet or other item, or for different plastic waste 98 items. Gases are sterilized and pass through flow release apertures 45 and through the filter 11. Because compaction is accomplished by gravity effects alone, the device in effect self-adjusts to the particular load type and amount, such that it does not attempt to compress non-compressible liquids or force excess molten plastic into the joint between the compaction head 44 and interior wall 24 of the melt chamber 22.

When the upper limit temperature is achieved, as sensed by a high temperature thermostat 61 positioned adjacent the melt block 21, the heating element 91 is deactivated. An over-temperature fuse may also be provided to insure that the device does not overheat should the thermostat 61 fail. As the temperature drops below about 250 degrees F, the molten plastic hardens into a puck 99, but since at this temperature the melt block 22 and puck 99 are too hot to handle the device remains in the locked condition. When the temperature drops to about 125 degrees F, a low temperature thermostat 62, likewise mounted adjacent the melt block 21, turns the motor 32 on to rotate the cams 33 and 34. The lifting cam 34 raises the piston assembly 40 and the puck 99, which is temporarily attached to the compaction head 44 because of the capture pins 51 and flow release apertures 45. As the compaction head 44 is repositioned, the ejection pins 52 strike the puck 99 and force it off of capture pins 51 and back into the melt chamber 22. When the motor control cam 63 completes the remaining half rotation, a second microswitch 65 stops the motor 32. With the perimeter of the locking cam 34 no longer in the locking recess 26, the melt block housing 20 can be pivoted forward and the puck 99 safely dumped.

It is contemplated that equivalents and substitutions for certain elements may be obvious to those skilled in the art, and the true scope and definition of the invention therefore is to be as set forth in the following claims.

I claim:

1. A device for the encapsulation of hazardous plastic waste consisting of syringes, needles, lancets and other sharp objects, said device comprising means to melt plastic waste within a melt chamber and means to compact said plastic waste into a hardened disposable puck, where said compaction means comprises a piston assembly having a compaction head configured to fit within said melt chamber, where the force to compact said plastic waste is supplied only by the weight of the piston assembly.

2. The device of claim 1, where said melt chamber is formed with a seamless interior wall and an open top, said compaction head passing through said open top into said melt chamber.

3. The device of claim 2, further comprising means to lift said compaction head from said melt chamber.

4. The device of claim 3, where said lifting means comprises an asymmetrically mounted lifting cam rotated by a motor.

5. The device of claim 4, further comprising a support framework containing guide sleeves, and said piston assembly further comprising guide rods which fit within said guide sleeves to provide for reciprocal motion between said piston assembly and said support framework.

6. The device of claim 5, where said compaction means comprises a piston assembly having a compaction head configured to fit within said melt chamber, wherein said compaction head includes means for temporarily attaching to said puck upon hardening.

7. A device for the encapsulation of hazardous plastic waste consisting of syringes, needles, lancets and other sharp objects, said device comprising means to melt plastic waste within a laterally elongated melt chamber having rounded ends and means to compact said plastic waste into a hardened disposable puck, where said compaction means comprises a piston assembly having a compaction head configured to fit within said melt chamber, wherein said compaction head includes means for temporarily attaching to said puck upon hardening and comprises a contact face having a raised transverse middle ridge to direct melted plastic waste toward said ends of said melt chamber.

8. The device of claim 7, where said temporary attachment means comprises at least one capture pin extending from said contact face.

9. The device of claim 7, where said temporary attachment means comprises at least one flow release aperture passing through said contact face of said compaction head.

10. The device of claim 9, further comprising at least one ejection pin which is aligned with said at least one flow release aperture, whereby said at least one ejection pin extends into said flow release aperture to detach said hardened puck from said compaction head when said piston assembly is removed from said melt chamber.

11. The device of claim 9, where said melt chamber comprises a seamless interior wall and an open top, said compaction head passing through said open top into said melt chamber, and further where said melt chamber is contained within a pivoting melt chamber housing, whereby said melt chamber can be pivoted away from said piston assembly for removal of said detached hardened puck.

12. The device of claim 11, where the force to compact said plastic waste is supplied only by the weight of the piston assembly.

13. The device of claim 7, where the force to compact said plastic waste is supplied only by the weight of the piston assembly.

14. The device of claim 7, where said contact face of said compaction head further comprises a pair of raised end bevels.

\* \* \* \* \*